United States Patent

Price

[15] 3,635,269
[45] Dec. 18, 1972

[54] METHOD AND MEANS FOR CUTTING TREES

[72] Inventor: John H. Price, 163 Frey Lane, Belleville, Ill. 62221

[22] Filed: Dec. 31, 1969

[21] Appl. No.: 889,532

[52] U.S. Cl. .................................. 144/309 AC, 144/34 F
[51] Int. Cl. ............................................. A01g 23/02
[58] Field of Search ................. 37/2; 144/34 A, 34 B, 34 F, 144/309 AC

[56] References Cited

UNITED STATES PATENTS

| | | | |
|---|---|---|---|
| 2,821,217 | 1/1958 | Shald | 144/34 F |
| 2,857,690 | 10/1958 | Yake et al. | 37/2 R |
| 2,877,572 | 3/1959 | Dyess | 37/2 R |
| 3,022,836 | 2/1962 | Bechman | 37/2 R |

OTHER PUBLICATIONS

Publication: Excavating Engineer; Nov., 1939, Page 646

Primary Examiner—Gerald A. Dost
Attorney—John D. Pope, III

[57] ABSTRACT

A tree cutter includes a frame and means on the frame for connecting it to a prime mover for movement in the direction of a tree. A blade is provided on the frame and includes a serrated cutting edge formed by an indentation in one of the blade's margins.

The blade is moved in the direction of a tree so that one end of the serrated cutting edge engages the tree and slices into it. The serrated edge is dragged along the tree until the tree is embraced within the innermost portion of the indentation whereupon the momentum of the blade will cause a shearing force to be applied to the tree.

11 Claims, 5 Drawing Figures

PATENTED JAN 18 1972　　　　3,635,269

INVENTOR
JOHN H. PRICE
BY John D. Pope
ATTORNEY

METHOD AND MEANS FOR CUTTING TREES

This invention relates to a method and means for cutting trees.

Removal of trees and underbrush from construction sites is usually done with heavy equipment such as bulldozers, draglines or tractors. This invention provides a method and means which can be used in conjunction with these heavy machines for clearing away underbrush and trees by sheering them off at ground level.

Among the several objects of the present invention may be noted the provision of a method and means for cutting trees which will permit quick and easy removal of trees, stumps, and underbrush; the provision of a method and means for cutting trees which applies a sawing action on the tree and also applies a string shearing force to the base of the tree; the provision of a method and means which can be used in conjunction with dragline equipment or other heavy construction equipment such as bulldozers or tractors for removing trees; the provision of a method and means for cutting trees which permits and snagging of a tree so that it can be pulled out by the roots; and the provision of a tree cutter which is durable and economical to manufacture. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a perspective view of the tree cutter;

Corresponding reference characters indicate corresponding parts throughout the several views of the drawings.

Figure 1:
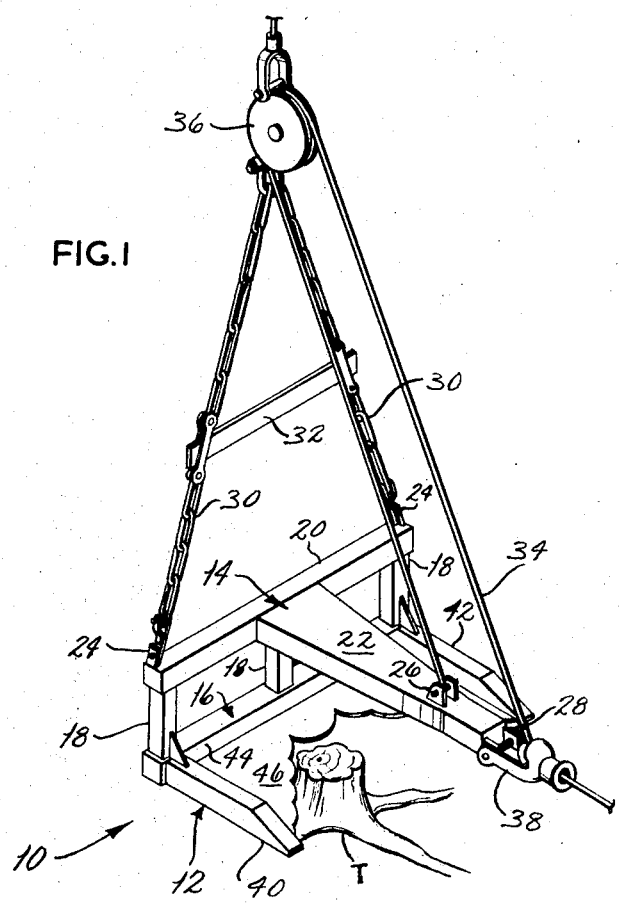
Figure 2:
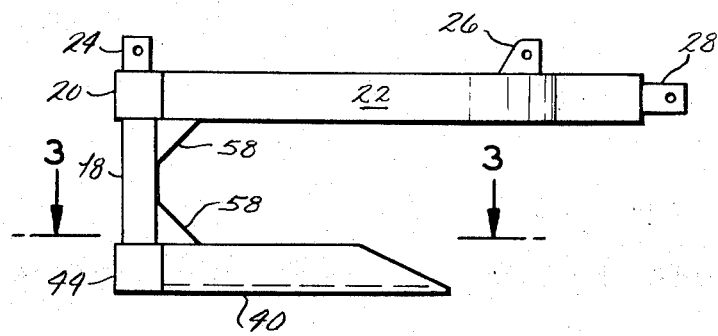
FIG. 2 is a side view of the tree cutter.
Figure 3:
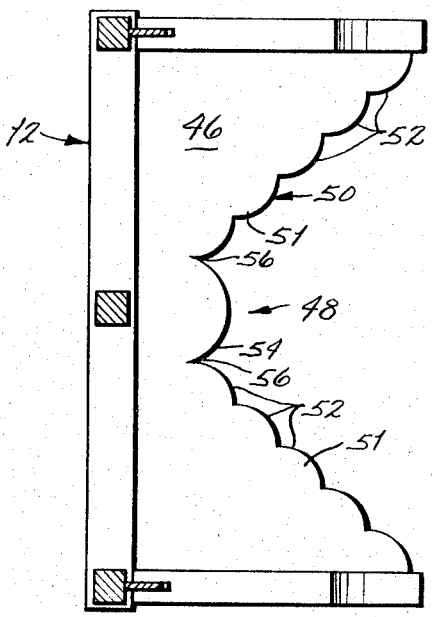
FIG. 3 is a sectional view taken along line 3—3 of FIG. 2.

Referring to FIGS. 1–3, a tree cutter 10 includes a frame 12 having an upper frame structure 14 and a lower frame structure 16 which are joined by three vertical frame members 18. Upper frame structure 14 is T-shaped and includes a crossbar 20 and a tongue 22. Extending upwardly from the opposite ends of crossbar 20 are a pair of angled mounting ears 24. A second pair of mounting ears 26 are provided on the upper surface of the forward end of tongue 22. A third pair of mounting ears 28 extend forwardly from the extreme forward tip of tongue 22. A dragline rigging is secured to tree cutter 10 and includes a pair of chains 30, a bar 32, a cable 34, a sheave 36, and a grommet 38. Chains 30 are connected at their lower ends to ears 24 and their upper ends are joined together by a bracket on sheave 36 to form triangle. Bar 32 extends between chains 30 approximately midway along their lengths. Cable 34 is secured at one of its ends to ears 26 and extends upwardly therefrom over sheave 36 and back downwardly through grommet 38 which is secured to ears 28. Vertical lifting and lowering of tree cutter 10 is accomplished by lifting or lowering sheave 36. Tilting of tongue 22 with respect to the horizontal is done by increasing or decreasing the tension in cable 34. The dragline rigging illustrated in FIG. 1 does not constitute part of this invention but merely illustrated how tree cutter 10 is used with a dragline. Tree cutter 10 could also be adapted for use with other heavy equipment such as bulldozers or tractors.

Lower frame structure 16 includes two forwardly extending members 40, 42, which are joined at their rearward ends by a third member 44, thereby giving lower frame structure 16 a U-shaped appearance. A blade 46 is welded within the interior of the U-shape of lower frame structure 16. The forwardly presented margin of blade 46 is formed in a substantially V-shaped indentation 48 (FIG. 3), the margins of which provide a cutting edge 50. Cutting edge 50 includes two lateral edges 51 having a plurality of serrations 52 thereon. Lateral edges 51 extend inwardly from the front of blade 46 and terminate at their inner ends adjacent a convex arcuate protrusion 54. A pair of apexes 56 are formed between the opposite ends of protrusion 54 and lateral edges 51 of cutting edge 50.

Frame members 18 are welded at their lower ends to third member 44 of lower frame structure 16 and extend upwardly therefrom where they are welded at their upper ends to crossbar 20 of upper frame structure 14. A plurality of gussets 58 are provided between frame members 18 and upper and lower frame structures 14, 16, to provide rigidity to frame 12.

Figure 4:
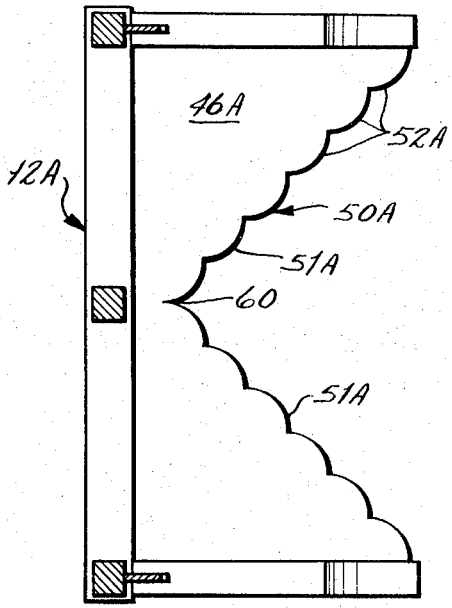
FIG. 4 is a sectional view similar to FIG. 3 and illustrating a modified form of the cutting blade.

Referring to FIG. 4, a blade 46A is a modification of blade 46 shown in FIGS. 1–3. Blade 46A includes a V-shaped cutting edge 50A having lateral edges 51A provided with serrations 52A and extending inwardly to a singular apex 60. Blade 46A is adapted for use with a frame 12A which is identical to frame 12 shown in FIGS. 1–3.

Figure 5:
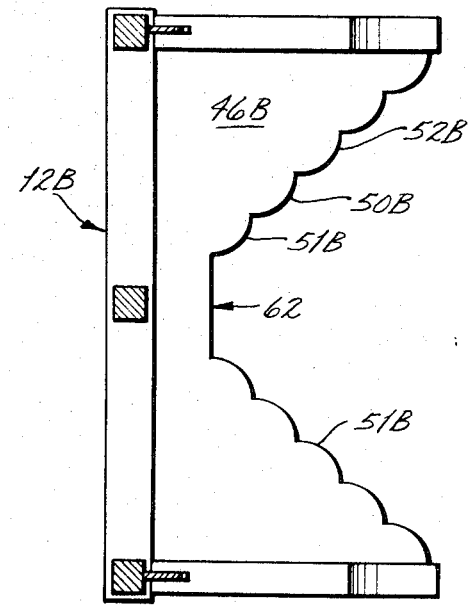
FIG. 5 is a sectional view similar to FIGS. 3 and 4 and illustrating an additional modification of the cutting blade.

Referring to FIG. 5, a blade 46B is an additional modification of blade 46 shown in FIGS. 1–3. Blade 46B includes an inwardly extending cutting edge 50B having lateral edges 51B provided with serrations 52B. Extending between the extreme inner ends of lateral edges 51B is a straight flat cutting edge 62. Blade 46B is mounted within a frame 12B which is identical to frame 12 shown in FIGS. 1–3.

In operation, tree cutter 10 is suspended from a dragline and is moved towards a tree T with cutting edge 50 being presented toward tree T. Cutting edge 50 is positioned when it strikes tree T so that the extreme outer end of one of lateral edges 51 is the first portion of blade 46 to engage tree T. The momentum of tree cutter 10 causes the inwardly slanted lateral edge 51 of cutting edge 50 to be dragged along one side of the tree, whereupon serrations 52 slice into tree T until tree T abuts against protrusion 54 at the extreme inner end of cutting edge 50. In this position, tree T is embraced between the arcuate edge of protrusion 54 and one of lateral edges 51. The momentum of tree cutter 10 causes cutting edge 50 to apply a shearing force to tree T. This shearing force will either cause the tree to be sheared off or will cause blade 46 to become embedded in tree T, thereby snagging it. In the latter case, the dragline or other power equipment can be used to pull tree T out by the roots. For cutting smaller trees and underbrush tree cutter 10 is dragged slowly along the surface of the earth. For thicker trees additional cutting power can be obtained by swinging tree cutter 10 towards the tree so that cutting blade 46 will have a substantial momentum when it strikes the tree.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A tree cutter comprising a frame, adjustable suspension means on said frame for connecting said frame to a prime mover, said suspension means swinging said frame in a predetermined direction, said frame including a substantially flat cutting blade extending from one side of said frame to an opposite side thereof and having a cutting edge formed thereon for shearing engagement with a tree when said frame is swung in said predetermined direction for impact with said tree.

2. At tree cutter as claimed in claim 1 wherein said suspension means are flexible.

3. A tree cutter as claimed in claim 1 wherein said cutting edge is serrated.

4. A tree cutter as claimed in claim 1 wherein said cutting edge is concave.

5. A tree cutter as claimed in claim 4 wherein said concave cutting edge is substantially V-shaped.

6. A tree cutter as claimed in claim 4 wherein the extreme inner end of said concave cutting edge is a flat straight edge.

7. A tree cutter as claimed in claim 1 wherein said cutting edge is concave and includes a pair of oppositely disposed lateral serrated edges extending inwardly along an incline towards the extreme inner end of said concavity, said lateral edges terminating to form at least one indented apex at said extreme inner end.

8. A tree cutter according to claim 1 wherein said frame comprises a blade support member formed around the periphery of said blade up to said cutting edge, said tree cutter further including an elongated truck bearing member spaced over said blade, and connecting means rigidly connecting one end of said truck bearing member to said frame, the opposite end of said truck bearing member being a free end extending away from the cutting edge of said blade.

9. A method for cutting trees comprising forming a frame around a substantially flat blade up to the cutting edge thereof to support the blade, serrating the cutting edge of the blade along a concave path and providing an elongated truck bearing member over said blade with one end of the trunk bearing member affixed to the frame and the other end being free and extending over and away from the cutting edge, swinging the frame toward a tree such that the serrations of the cutting edge slice into the tree until the tree bears against the truck bearing member.

10. The method of claim 9 including suspending the frame from a rigging whereby the frame can be swung along a predetermined arc to shearing engage a tree upon swinging impact of the cutting edge with the tree.

11. The method of claim 9 including pulling the frame to remove the tree from its standing position.

* * * * *

UNITED STATES PATENT OFFICE
CERTIFICATE OF CORRECTION

Patent No. 3,635,269              Dated January 18, 1972

Inventor(s) John H. Price

It is certified that error appears in the above-identified patent and that said Letters Patent are hereby corrected as shown below:

On the first or title page in the line designated [45] "Dec. 18, 1972" should read -- Jan. 18, 1972 --. Column 1, line 16, "string" should read -- strong --; line 20, "permits and" should read -- permits the --; line 52, "form triangle" should read -- form a triangle --. Column 2, line 32, "tree T is embraced" should read -- tree T bears against tongue 22 and is embraced --; line 63, "At" should read -- A --. Column 3, line 10, "truck" should read -- trunk --; line 12, "truck" should read -- trunk --; line 13, "truck" should read -- trunk --. Column 4, line 2, "truck" should read -- trunk --; line 7, "truck" should read -- trunk --; line 11, "shearing" should read -- shearingly --.

Signed and sealed this 6th day of June 1972.

(SEAL)
Attest:

EDWARD M. FLETCHER, JR.           ROBERT GOTTSCHALK
Attesting Officer                 Commissioner of Patents